United States Patent [19]

Wysong

[11] 4,156,047

[45] May 22, 1979

[54] WATER-SOLUBLE FILMS FROM POLYVINYL ALCOHOL COMPOSITIONS

[75] Inventor: Robert D. Wysong, Talleyville, Del.

[73] Assignee: E. I. Du Pont de Nemours and Company, Wilmington, Del.

[21] Appl. No.: 933,078

[22] Filed: Aug. 11, 1978

Related U.S. Application Data

[60] Division of Ser. No. 813,961, Jul. 11, 1977, Pat. No. 4,119,604, which is a continuation-in-part of Ser. No. 715,237, Aug. 18, 1976, abandoned.

[51] Int. Cl.$^2$ .................... B29D 7/02; C08K 5/06; C08L 29/04
[52] U.S. Cl. .................................................. 428/220
[58] Field of Search .................. 428/220; 260/33.2 R, 260/33.4 R, 33.4 R, 29.6 NB, 29.6 WA

[56] References Cited

U.S. PATENT DOCUMENTS

| | | | |
|---|---|---|---|
| 2,948,697 | 8/1960 | Robertson | 260/29.6 B |
| 3,157,611 | 11/1964 | Lindenmann | 260/29.6 B |
| 3,365,413 | 1/1968 | Monoghan et al. | 260/33.2 R |
| 3,374,195 | 3/1968 | Bianco et al. | 260/33.4 R |
| 3,510,542 | 5/1970 | Strand | 260/29.6 WA |
| 3,607,812 | 9/1971 | Tokigawa | 260/33.4 R |
| 3,882,196 | 5/1975 | Hanke | 260/33.4 R |
| 3,997,489 | 12/1976 | Coker | 260/33.4 R |

FOREIGN PATENT DOCUMENTS

| | | | |
|---|---|---|---|
| 1201957 | 1/1960 | France | 260/33.2 R |
| 44-28588 | 11/1969 | Japan | 260/33.4 R |
| 1330745 | 9/1973 | United Kingdom | 260/33.2 |

*Primary Examiner*—Allan Lieberman

[57] ABSTRACT

Films prepared by melt extrusion or aqueous casting from compositions consisting essentially of a (i) resin mixture containing a low molecular weight polyvinyl alcohol and a medium molecular weight polyvinyl alcohol, and optionally, a copolymer of vinyl alcohol and an ethylenically unsaturated ester and (ii) as a plasticizer a polyethylene glycol. The films are suitable for use as packaging film in automatic packaging equipment. They can be used to package pulverulent materials, and the film package containing the pulverulent material can be charged directly to water in which the film will dissolve, thus eliminating the problem of user contact and exact measuring of the package contents, as well as disposal of containers in which the pulverulent materials would otherwise be packaged. Moreover, the films provide enhanced resistance to breakage of packages made therefrom when such packages are handled or shipped, even under cold or dry conditions.

10 Claims, No Drawings

WATER-SOLUBLE FILMS FROM POLYVINYL ALCOHOL COMPOSITIONS

CROSS REFERENCE TO RELATED APPLICATIONS

This application is a division of U.S. patent application Ser. No. 813,961, filed July 11, 1977, now U.S. Pat. No. 4,119,604, which in turn is a continuation-in-part of U.S. patent application Ser. No. 715,237, filed Aug. 18, 1976, now abandoned.

BRIEF SUMMARY OF THE INVENTION

This invention relates to novel compositions which possess enhanced utility for making water-soluble films. It relates also to the water-soluble films and their preparation. The novel compositions of this invention consist essentially of a (i) resin mixture containing a low molecular weight polyvinyl alcohol and a medium molecular weight polyvinyl alcohol, and optionally, a copolymer of vinyl alcohol and an ethylenically unsaturated ester and (ii) as a plasticizer, a polyethylene glycol. These compositions can be prepared from resin and plasticizer components which are available commercially; and consequently, they are comparatively inexpensive. Films of this invention can be prepared by the use of conventional melt-extrusion or aqueous-casting techniques and equipment. These films are rapidly and completely soluble in water and are suitable for use as packaging film in automatic packaging equipment. Preferably, films prepared from the novel compositions of this invention are rapidly and completely soluble in cold water (e.g. at 4° C.). Films prepared from the novel compositions of this invention can be used to package pulverulent materials, and the film package containing the pulverulent material can be charged directly to water, thus eliminating the problems of user contact and exact measuring of the package contents, as well as disposal of containers in which the pulverulent materials would otherwise be packaged. In addition, such films provide added safety an economy for users thereof, in that they impart enhanced resistance to breakage during handling or shipping of packages formed therefrom.

BACKGROUND OF THE INVENTION

Many commonly used chemicals are produced and sold in pulverulent form but are then slurried, dispersed, or dissolved in water when used by the consumer. Examples of these materials are pesticides, specifically insecticides, herbicides, nematicides, and fungicides, and the like, which are applied as a water spray; cleaning products, such as laundary detergents, bleaches, and caustic cleaners, which are dissolved in wash water; process chemicals, such as carbon black and activated charcoal, which can be slurried in water; and pigments and dyes which are dissolved or dispersed.

The films of the invention eliminate problems associated with the use of these pulverulent types of products. One such type of problem involves exposure of the user to the chemical, or chemicals, of which such products are composed. Opening a package of finely ground material, measuring an amount of the material, and transferring the measured amount from the package to equipment in which the material is contacted with water can generate air-borne dust with which the user may undesirably come in contact. Thus, a pesticide dust may be irritating to the eyes or mucous membranes of the nose or throat of the user. Such air-borne dust can also contaminate the area in which it is generated. For example, an herbicide dust could damage plants in the area in which the packages are opened, and pigment or activated charcoal dusts present extremely difficult clean-up problems.

Another type of problem which may be encountered in using common pulverulent chemicals relates to accuracy of measurement thereof. It is frequently extremely difficult to accurately measure materials which have become compacted and/or lumpy, or to transfer powdery materials in the areas exposed to wind. The use of too much or too little of an active ingredient is undesirable. In any event, the former is wasteful, and it can also be harmful; e.g. the use of too much of a pesticide can cause damage to desired plants. The use of too little of an active ingredient can make it partially or totally ineffective.

Moreover, after a chemical has been used, the user is faced with the problems of disposing of the package in which the chemical was delivered. It may contain residual amounts of a material which presents a pollution problem, or is potentially hazardous to humans, harmful to plants or animals, or merely unpleasant or unsightly.

Currently available water-soluble films and packages possess one or more of a variety of deficiencies. None of the currently available polymeric compositions based on polyvinyl alcohol can be used to prepare films having the following properties in combination: rapid cold water-solubility; melt-extrudability; good low-temperature package drop strength; and ease of use in automatic packaging techniques, including good heat-sealability and ease of tracking. Many films, which are characterized as water-soluble, dissolve slowly or dissolve incompletely in cold water, resulting in the formation of gel-like particles. These particles tend to deposit on vessel walls, piping, pumps, and valves, and restrict or prevent flow through screens and nozzles.

Many of the currently available compositions utilized in the preparation of such films possess physical properties which require the use of large, expensive, technologically complex film-making equipment, the operation of which consumes large amounts of energy, e.g., solvent-casting (or doctor knife, belt-casting or band casting). Preferable to such preparation methods is melt extrusion. Melt-extrusion process equipment, when compared to the equipment used in water casting, is extremely small, inexpensive, technologically simple, and consumes very little energy. However, there are few polymeric compositions known which are sufficiently water-soluble so as to be suitable, and those that may be sufficiently water-soluble are not sufficiently melt-extrudable to be suitable.

Many water-soluble films of the prior art possess physical properties which make the film unsuitable for use in packaging quantities of pulverulent materials in the range of one hundred grams to ten kilograms (e.g., low temperature package drop strength, yield strength, tear resistance, toughness, flexibility). Such films are also undesirable for the use in automatic packaging machinery. The constituents of many of the water-soluble packaging films currently available are, in general, difficult to obtain or expensive.

Tsuchiya et al., in Japanese publication No. 28,588/69 disclose that water-soluble films can be made by melt-extrusion from 100 parts of a polyvinyl alcohol having a solution viscosity of 18 cps ±2 and a degree of saponification of 86.5–89 mol percent, and 10–43 parts of ethylene glycol as a plasticizer. Tsuchiya et al. also list glycerin, triethylene glycol, and other glycols, such as polyethylene glycol, as possible plasticizers; however, no polyethylene glycol is particularly identified (such as by molecular weight); and no data are given for the use of any plasticizer other than ethylene glycol. Moreover, Tsuchiya et al. state that when the die or resin melt temperature is 140° C. or less, it is impossible to extrude the material as a film, and that at temperatures of 185° C. and higher, unsatisfactory film was obtained.

Takigawa et al., in U.S. Pat. No. 3,607,812, describe melt-extrusion of polyvinyl alcohol film which is insoluble in water at a temperature below 40° C. from 87–95 parts by weight polyvinyl alcohol having a degree of polymerization between 700 and 1,500 and a degree of hydrolysis of at least 97 mol percent, which polyvinyl alcohol is combined with 13 to 5 parts by weight of a polyhydric alcohol plasticizer, such as polyethylene glycol having a molecular weight of approximately 200.

Monaghan et al., in U.S. Pat. No. 3,365,413 disclose preparation of polyvinyl alcohol film by a blow-extrusion process with the object of preparing a completely clear film which is soluble in water; no cold water-solubility is disclosed. Although their film was made by blow-extrusion, in preparing packages therefrom, they used an aqueous-sealing technique rather than the more convenient heat-sealing technique which is conventionally used with thermoplastic films. Monaghan et al. indicate that a composition suitable for this purpose must satisfy certain requirements as to the type of polyvinyl alcohol used, and as to the plasticizer that is used. They specify in general that the polyvinyl alcohol be hydrolyzed so as to contain between 60 and 75% of hydroxyl groups and 40 to 25% of residual ester groups. They specify also the use generally of monophenyl ethers of polyoxyethylene, containing from 2 to 7 ethylene oxide units per molecule, as a plasticizer. They indicate, on the other hand, that a glycerin type of plasticizer may be used under very particularly defined conditions. In that connection, in Example 5, they prepared a first mixture of 100 parts of a polyvinyl alcohol resin, containing about 37% of residual acetate groups and having a solution viscosity of 9 cps, with 35 parts of a phenolic ether of a polyoxyethylene resin containing an average of 5 oxyethylene units per molecule as a plasticizer. They also prepared a second mixture of 100 parts of an essentially completely hydrolyzed polyvinyl acetate, having a solution viscosity of 15 cps, with 25 parts of dry glycerin as a plasticizer. They then combined 95 parts by weight of the first mixture and 5 parts by weight of the second mixture, after which the combined mixtures were pelletized and fed to an extruder die system for preparation of film.

DETAILED DESCRIPTION OF THE INVENTION

The novel compositions of this invention consist essentially of (i) resin mixtures of 40 to 55 parts by weight of a low molecular weight polyvinyl alcohol, 25 to 60 parts by weight of a medium molecular weight polyvinyl alcohol, and 0 to 20 parts by weight of a copolymer of vinyl alcohol and a comonomer containing a group having the formula:

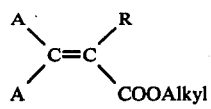

and (ii) 10 to 30 parts of a polyethylene glycol per 100 parts of the resin mixture as a plasticizer therefor.

The low molecular weight polyvinyl alcohol has a viscosity in the range between 3 and 10 cps (measured on a 4% aqueous solution at 20° C. by the Hoeppler Falling Ball Method, ASTM-D 1343-56, Part 8, 1958, page 486) and a degree of hydrolysis in the range between 85 and 90 mol percent, dry basis, determined by saponification, e.g. KOH; see Polyvinyl Alcohol, Edited by C. A. Finch, Published by John Wiley & Sons, pages 565 to 568. The medium molecular weight polyvinyl alcohol has a viscosity in the range between 10 and 35 cps, and a degree of hydrolysis in the range between 85 and 90 mol percent (both measured as aforesaid). Both the low molecular weight partially hydrolyzed polyvinyl alcohol and the medium molecular weight partially hydrolyzed polyvinyl alcohol used according to this invention may be prepared by the partial acylation of a fully hydrolyzed polyvinyl alcohol, or preferably by the partial hydrolysis of a polyvinyl ester. Whether prepared by acylation or hydrolysis, the acyl group in either case may contain up to 4 carbon atoms. The hydrolysis reaction may be acidic or basic and be performed in water or alcohol. Preferably, the polyvinyl alcohol (whether low or medium weight) is prepared by base catalyzed partial methanolysis of polyvinyl acetate.

The copolymer is made up of 90 to 98 weight percent polymerized vinyl alcohol units and 10 to 2 weight percent of polymerized ester units which in monomeric form have the formula:

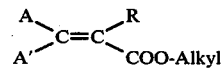

wherein
A is H or —CH$_3$;
A' is H or —COO—Alkyl;
R is H,

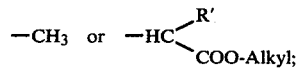

provided that when R is

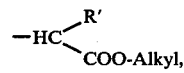

both A and A' are H;
R' is H or —CH$_3$; and
Alkyl contains 1 to 4 carbons.

Preferred monomers, because of commercial availability, are methyl methacrylate, methyl acrylate, methyl fumarate, methyl maleate or methyl itaconate. This vinyl alcohol/unsaturated ester copolymer has a degree of hydrolysis in the range between 95% and 100% (i.e. it contains between 0 and 5 mole percent of units of the vinyl ester from which it is derived, e.g. vinyl acetate, the degree of hydrolysis being measured as aforesaid), and has a viscosity between 10 and 60 cps (measured as above). These copolymers can be prepared by the process disclosed in U.S. Pat. No. 3,689,469, the contents of which are incorporated herein by reference.

The plasticizers of this invention are polyethylene glycols having an average molecular weight in the range of about 285-420. This average molecular weight can be determined by measuring the hydroxyl value of a polyethylene glycol sample, e.g. the sample is acylated with an organic acid anhydride, such as acetic anhydride or phthalic anhydride, in pyridine solution followed by titration with a base such as alcoholic KOH or aqueous NaOH with phenolphthalein as an indicator.

As is common with commercial polymers of this nature, a polyethylene glycol with an average molecular weight within the 285-420 range would be expected to contain some fractions of lower and higher molecular weight (i.e. lower and higher degrees of polymerization), as typified by distribution curves. This is discussed by Fletcher and Persinger in the Journal of Polymer Science: Part A-1, Vol. 6. 1025-1032 (1968). Examples of suitable commercial polyethylene glycols are Union Carbide's Carbowax ® 300 and Carbowax ® 400, which are described in their bulletin, "Carbowax Polyethylene Glycols" (pages 22, 28, 29), F-4772G, 1/72-10M, which is hereby incorporated by reference. Carbowax ® 400, having an average molecular weight in the range between 380 and 420 is preferred.

Proper proportioning of the components of the compositions of this invention is important. The plasticizer promotes ease of melt-extrudability to the composition of this invention and imparts rapid cold water-solubility to the films prepared therefrom. In addition, as the plasticizer concentration is increased, the strength of such film is improved when packages formed therefrom are subjected to drop tests at low temperature. Below 10 parts by weight of the plasticizer per 100 parts by weight of the resin mixture, the compositions of this invention would have poor melt-extrudability. Moreover, films formed from a composition containing less than 10 parts by weight of the plasticizer would have poor package strength when subjected to a package drop test at low temperature. Use of more than 30 parts by weight of the plasticizer per 100 parts by weight of the resin mixture results in a composition which has an adequate extrudability rate, but which exhibits an unacceptable degree of exudation; i.e. the polyethylene glycol is at least partially rejected by the resin mixture during extrusion of film, resulting in a slimy coating thereon.

Likewise, the proportions and identity of the components of the resin mixture are essential to obtaining a composition which can be melt-extruded to films having acceptable solubility in cold water. The compositions of my copending application Ser. No. 525,446, filed Nov. 20, 1974, are suitable for preparing films by melt-extrusion which are soluble in cold water and in which the plasticizer is sufficiently compatible. The films formed in accordance with that prior copending application are suitable for preparing packages as described therein which have acceptable film and package properties. However, the films of the present invention have improved package drop strength.

If one substitutes a medium molecular weight polyvinyl alcohol (as defined herein) for the low molecular weight polyvinyl alcohol of my prior application Ser. No. 525,446, and plasticizes the same as disclosed herein, that composition cannot be extruded by a melt-extrusion technique. Moreover, if one attempts to substitute the copolymer described herein for the low molecular weight polyvinyl alcohol of that prior copending application, it is found that the plasticizers of that prior application and this application are not compatible with the copolymer; i.e. the plasticizers exude from films formed therefrom at room temperature. Moreover, films formed from such plasticized copolymers are not cold water soluble, because the copolymer is a hot water-soluble polymer. If, on the other hand, one prepares a composition containing 75 parts by weight of the low molecular weight polyvinyl alcohol of this invention and 25 parts by weight of the copolymer of this invention, suitably plasticized as set forth herein, one can form films therefrom by melt-extrusion, in which films the plasticizers of this invention will be compatible. However, such films are not cold water-soluble.

The preferred compositions of this invention consist essentially of (i) resin mixtures of 40 to 55 parts by weight of the low molecular weight polyvinyl alcohol of this invention, 25 to 50 parts by weight of the medium molecular weight polyvinyl alcohol hereof and 10 to 20 parts by weight of the copolymer hereof, and (ii) 15 to 25 parts by weight of the plasticizer of this invention. The most preferred compositions of this invention consists essentially of (i) resin mixtures of 40 to 50 parts by weight of the low molecular weight polyvinyl alcohol hereof, 30 to 45 parts by weight of the medium molecular weight polyvinyl alcohol hereof and 15 to 20 parts by weight of the copolymer hereof and (ii) 20 to 25 parts by weight of the preferred polyethylene glycol plasticizer hereof.

Small quantities ($\leq 5$ pbw based on 100 pbw of resin mixture, preferably 0.1-2 pbw) of adjuvants commonly used in cellulose, vinyl, or polyolefin films, such as anti-oxidants, release agents, antiblock agents, surfactants, dispersants and slip agents, may be incorporated either before or after melt-extrusion or aqueous-casting; provided that the water-solubility or other primary properties of the resulting film are not appreciably impaired. For example, the web can be dusted with talc during windup prior to storage or packaging. One or more of the following materials may be included in the composition prior to melt-extrusion or aqueous casting: butylated hydroxyanisole; butylated hydroxytoluene; sodium benzoate; lactose; propyl gallate; urea; thiourea; 1,2-dihydro-6-ethoxy-2,2,4-trimethyl quinoline; ethylene oxide/propylene oxide copolymers (e.g. Pluronics ® or Plurafacs ® polymers, BASF Wyandotte Corp., Wyandotte, Michigan); adducts of phenyl- or alkylphenols, fatty alcohol or fatty acids with mono- or poly-alkylene oxides (wherein the alkylene oxide component is ethylene oxide, propylene oxide or mixtures thereof); fatty acid esters of glycerol or sorbitol; organophosphorus acid esters, e.g. ethoxylated alkyl or aryl acid phosphates; inorganic fillers such as clays, silica (e.g., Cab-o-sil ® L-5, 0.5 microns, or M-5, 0.012 microns, Cabot Corp., Boston, Mass.), alumina, silicates such as sodium silicate, lithium polysilicate (e.g. Polysilicate ® 85—E. I. du Pont de Nemours and Company, Wilmington, DE.) or hydrated sodium silicoaluminates (e.g. Zeolex ® 23A, J. M. Huber Corp., New York, N.Y.)) can be used; useful organic materials include among others (1) long chain fatty acids, alcohols, amides, or salts (e.g. stearic acid, stearyl alcohol, erucamide, calcium stearate, magnesium stearate, (2) waxes, (3) partially oxidized low molecular weight polyethylene (e.g. XL-223—American Hoechst), and (4) silicones (e.g. dimethylsilicones).

Further, atmospheric moisture acts as a coplasticizer which toughens the film. Films prepared from preferred compositions of this invention are the least moisture-dependent, and hence would require less moisture for maximum toughness. In the process for preparing the films of the present invention by melt-extrusion, the operating temperatures therefor result in there being little or no water present in the film as it is first formed. However, as the film leaves the extrusion apparatus, it contacts and begins to equilibrate with the ambient atmosphere, commonly containing moisture of from 25–70% relative humidity. The preferred dry basis moisture content of the film before slitting is 4–5%; 5–7% is preferred for the finished film for packaging, and 7–8% is preferred for film comprising the final water-soluble package. The preferred relative humidity range for automatic packaging is from 25–65%, with 35–55% being most preferred. The foregoing moisture content and humidity ranges may be extended (especially at the lower ends thereof) when films, prepared from preferred compositions of this invention, are used.

The term "film", as used herein means single layer unsupported sheets having a thickness in the range between 0.5 and 10 mils; it does not include laminates or coatings. These films can be prepared at commercial rates using conventional melt-extrusion techniques and equipment (e.g. those commonly used in the preparation of polyethylene, polypropylene, or polyvinyl chloride films) or aqueous-casting techniques and equipment (e.g. those of U.S. Pat. No. 3,374,195). The former are usually preferred. The novel compositions of the present invention, in the form of powder, granules, or pellets, can be melted, extruded through a slit or annulus, quenched by air and then drawn down and/or blown to form a thin film. Such drawing or blowing can impart orientation to the film.

When films are prepared by melt-extrusion, it is preferable to first pelletize the compositions of the present invention. Pelletizing techniques and equipment are such that the components of the compositions of this invention are more uniformly mixed. Moreover, the compositions of the present invention are more readily handled in film-making equipment if they are in pellet form than if the compositions are in powder form. Pellets can be prepared by melt-extrusion of a powder blend; usually, the extruder barrel is vented so as to permit any steam to escape. A single or twin-screw extruder may be used. It is preferred that polymer shear be kept to a minimum during the preparation of pellets. This preferred result can be achieved in several ways, e.g. by appropriate choice of extruder design and/or by control of operating conditions during the melt-pelletizing operation.

The films of this invention are preferably prepared by blow extrusion from a melt for a number of reasons, e.g. biaxial orientation can be achieved during the blowing process. Orientation toughens the film (e.g., in impact strength and tear strength). Similar results can be obtained with films prepared by the aqueous-casting method; e.g., the film can be oriented by the use of tenter frame equipment and techniques.

While orientation advantageously toughens film, whether made by melt-extrusion or by water-casting, care must be exercised in orienting the film so as not to induce crystallization of the polymeric components of the film to a substantial extent, as substantial crystallinity can reduce the rapidity with which the film can be dissolved in cold water (e.g., 4° C.). Not only can drawing or blowing the film induce crystallization to an extent that low temperature water solubility may be reduced, but other factors encountered in melt-extrusion of pellets and film can have the same effect. Melt extrusion equipment and techniques should be used which provide efficient mixing of the several polymeric components as well as the plasticizer and any other adjuvants being used for preparing the film. However, the equipment and techniques should provide a melt in which melt-shear will not tend to crystallize the polymeric components to the extent that cold water-solubility of the resulting film is reduced below the level needed for efficient use of the film in the field. Efficiently quenching the film emerging from the melt-extruder will also reduce the tendency to crystallization and have a consequent advantageous effect in connection with its cold water solubility.

The plasticizers contemplated by this invention have a beneficial effect with regard to the cold water solubility of the films made from the compositions of this invention. Likewise, surfactants or dispersants will provide for more rapid dissolution of such films. Exemplary of such surfactants or dispersants are the alkylene oxide copolymers and alkylene oxide adducts, as well as the glycerol esters, sorbitol esters and organo-phosphorus esters described herein.

Films prepared from the novel compositions of this invention possess advantageous properties over prior art films prepared from polymeric compositions based on polyvinyl alcohol. These advantageous properties obtain whether the compositions of this invention are used for making film by melt-extrusion or by water casting. Each such method of fabrication gives films with particular advantages. The choice of film-forming method must be based upon a balance of convenience among the desired properties.

All of the novel compositions of this invention combine the advantage of being melt-extrudable with several advantageous properties in films prepared therefrom as aforesaid. The polymeric components and the plasticizer component of the compositions of this invention are sufficiently compatible with one another that undesirable exudation of the latter does not occur in the films prepared by either such method. All of the compositions of this invention provide films, made by either method, which possess improved low-temperature package drop strength; moreover, such films provide for heat-sealability and ease of tracking and handling generally in automatic packaging equipment. In addition, all of the compositions of this invention are rapidly and completely soluble in cold water, e.g. 4° C., and they can be used to prepare films having sufficient solubility so as to be useful in agricultural spraying methods. Such films will dissolve completely in water at temperatures normally encountered in such agricultural uses; e.g. about 4° C. to 20° C. Films prepared by either method from preferred compositions of this invention additionally possess moisture independence, as evidenced by improved dry package drop strength, and they also have good slip even at high relative humidities.

With the exception of cold water-solubility, films prepared from any of the compositions of this invention by melt-extrusion possess properties which are equal to or better than those of films prepared by aqueous casting. While the solubility rate of films prepared by melt extrusion may in some instances be somewhat slower than in films prepared by aqueous casting, melt-extruded films are superior in strength characteristics (e.g. dry flex, wet package drop strength, dry package drop strength, tensile strength, and stress flex infra). The method of film fabrication has little or no effect on such characteristics as compatibility of components, heat sealability and slip.

The cold water-soluble packaging films of this invention are particularly useful for packaging pulverulent, dusty, noxious, irritating, and/or toxic materials which must be dispersed, slurried, suspended or dissolved in water or mixed solvents, one of which is water. For this reason, these films are especially suited for packaging agricultural chemicals. Films prepared from preferred compositions of this invention are well suited for packaging pulverulents which have the effect of desiccating the film. Such desiccating pulverulents would embrittle the films of the prior art, making it impossible to ship, without breakage, film packages containing such pulverulents, especially in cold weather. The films of the present invention can also be used in the packaging of liquid substances, such as liquid agricultural formulations which are to be dispersed in water and which are based on water-immiscible and polyethylene glycolimmiscible oils and hydrocarbons such as cyclohexane, mineral oil, and kerosene. Examples of materials which are usefully packaged in premeasured portions in packages made of the films of the present invention are pesticides (such as insecticides, herbicides, nematicides, and fungicides), cleaning products (such as laundry detergents, bleaches, and caustic products), process chemicals (such as catalysts for polymerizations, carbon black, activated charcoal, pigments, and dyes), foodstuffs, and food additives. Other uses involve preparing premeasured portions of incompatible materials such as flour and oil; and the like in separate water-soluble film packages and overwrapping these separate packages in a single moisture-proof packaging material. When used, the separate water-soluble packages containing the premeasured portions of additive or chemical are added simultaneously to the liquid in suitable mixing equipment, thus preventing premature reaction or mixture and eliminating sources of measuring errors.

In order to protect the water-soluble package during storage, shipping, and handling, an overwrap should be provided. It is not necessary that such overwraps be moisture-proof in order to minimize damage from ordinary handling of the packages. Moistureproof overwrap is usually preferred as it will prevent damage from atmospheric moisture such as rain, and dew and from accidental contact with water by splashing or from wet hands, as well as embrittlement and consequent breakage of film resulting from moisture loss under very cold conditions. This moistureproof overwrap can be provided for either individual packages or groups of packages, whichever appears to be most desirable for the individual case. Moistureproofed cartons may be used. Of course, once the overwrap is removed, the soluble packages must be protected from water contact or must be used promptly.

Suitable materials for the overwrap are the polyolefin films such as polyethylene or polypropylene, Kraft paper moistureproofed with polyethylene, moistureproof cellophane, glassine, metal foils, polyester, polyvinyl chloride, polyvinylidene chloride, and combinations of these materials as in laminates. The choice of the overwrap would be dictated by costs and strengths required, as well as the particular water-soluble film and pulverulent used. Inexpensive overwrap, e.g., polyethylene, may be used with films prepared from preferred compositions of this invention, even though such overwraps have high water vapor permeability.

The following Examples and Test procedures further illustrate the present invention. All parts and percentages are by weight unless specified otherwise (pbw=parts by weight).

STANDARD TESTS

I. Composition Constituent Compatibility

This is a test for exudation of the plasticizer from a film under ambient conditions.

This test is conveniently performed on a film which has been melt extruded or has been solution cast as follows:

Approximately 30 grams of an aqueous stock solution (10–40%) of the resin mixture is stirred with the desired amount of neat plasticizer at room temperature with a high speed disc stirrer until the mixture is visually homogeneous. Brief steam heating can be used to aid the mixing. The resulting casting solution is poured onto a Lucite ® plate and drawn down with a doctor knife having a clearance such that a 1–2 mil film can be stripped from the plate following overnight drying at ambient conditions.

Exudation exists to an undesirable level when a layer of plasticizer is evident by visual inspection of a film upon wiping a cotton swab across its surface after storage of the film for 48 hours at 70% relative humidity.

II. Cold Water Solubility Rate

Each of the following tests is performed on film which has been pre-equilibrated at 25–70% relative humidity for approximately 24 hours.

A. Spray Tank Cold Water Solubility Rate

In general, this test simulates tank conditions in the field. A package of pesticide is dropped into cold water, with mild agitation, and the pesticide is dispersed. The resulting aqueous dispersion (or solution) is pumped through a fine screen. The screen is then quickly sprayed with a fine mist of a developing liquid and is inspected for residual gels or pieces of film.

In particular, a 18.9 liter capacity steel spray tank (30.5 cm. diameter by 55.9 cm. high) is insulated and is filled with tap water, and cooled to 4° C. The water is circulated at a rate of about one to ten gallons per minute through a valve at the bottom of the tank, through a centrifugal pump (Eastern Industries, Model D6, Type 215, 1550 RPM, 1-3 amp., 1/30 HP.) and back into the top of the tank. A heat-sealed "pillow pack" prepared from the film under test and containing 4 to 8 ounces of a pulverulent pesticide is dropped into the tank. A timer is started immediately and the "break time" (which occurs when the water first enters the pillow pack and contacts the pesticide) and the "release time" (which occurs when the package sinks because of the entry of water or when the pesticide begins to disperse and separate from the remains of the package—generally the pesticide drops away from the floating package) are noted.

Immediately thereafter, a flat steel paddle stirrer (7.62 cm. wide×1.91 cm. high×0.32 cm. thick) is driven at 300 rpm. Each minute, a sample of the stream entering the tank is checked for gel by passing it through a 50 mesh screen (opening 0.297 mm., wire diameter 0.215 mm.) suspended just above the tank. As soon as this inspection reveals no further gel, the time is noted. This time is considered to be a valid indication of complete dissolution if, upon immediately dumping the entire tank contents through the screen and developing the screen by spraying it with acetone or a saturated aqueous solution of FD&C Blue No. 1, no gel is found (the time being noted as "complete dissolution" time). The absence of gel when the entire operation is completed within 15 minutes is considered satisfactory.

B. Film Disc Cold Water Solubility Rate

This is a quick laboratory test which simulates the Spray Tank Cold Water Solubility Rate test described in detail above. The gauge of a 3.18 cm. diameter disc of film 1–2 mils in thickness is measured to the nearest 0.1 mil with a micrometer. A rubber gasket, formed by punching a 2.54 cm. diameter hole in a rubber disc 3.49 cm. in diameter and 0.16 cm. thick, is placed on the film disc and two flat metal rings, the smaller having a 2.54 cm. diameter hole, are used as a frame to clamp the disc tightly. The frame with film mounted therein is placed on a small tripod and a lead shot of 2.00–2.38 mm. diameter is placed on the film disc. This entire rig is lowered into a one liter beaker (the tripod is ½ as high as the beaker) containing 900 ml. of tap water at 4° C., and a timer is started immediately. When the shot breaks through the film disc, time is noted as the "drop time", and a 5.08 cm. magnetic stirring bar is started and maintained at 75 rpm. As soon as visual inspection reveals no gel or pieces of film, the time is noted, as the "complete dissolution time". Such inspection is considered to be a valid indication of complete dissolution of the film if, upon immediately pouring the contents of the beaker through a screen and developing the screen as in the Spray Tank Test, no gel is found. A "final solubility rate" is obtained by dividing the "complete dissolution time" (in minutes) by the film thickness (in mils). A final solubility rate of 2 mins./mil or less is very suitable for practical use of such films in the agricultural field. Aqueous cast films prepared from all of the compositions of this invention gave final solubility rates of 1.5 min/mil or less. The final solubility rate for melt-extruded films may depend upon extrusion conditions, as well as plasticizer and/or surfactant content. Many melt-extruded films prepared from compositions of this invention have a final solubility rate of about 2 min/mil or less.

III Melt Extrudability

A. The test instrument used in this test is a Plastometer (Model C, F. F. Slocomb Corp., Wilmington, Del.) fitted with an orifice 0.8 cm. long and 0.20 cm. in diameter. The piston and weight are 100 and 4900 grams, respectively.

One-half to one gram of the film, conveniently in the form of the film strips (aqueous cast film from Test I), are loaded into the Plastometer barrel at 220°–225° C., and the piston is pushed down by hand to compact the film. With a Teflon ® plug set against the orifice, the film composition under test is allowed to preheat for about 7 minutes (granular or pelletized compositions may also be used, but longer preheat times are required). The plug is removed and the weight is placed on the piston. As a rod of molten polymer begins to extrude, it is cut off with a spatula, and a stopwatch is started simultaneously therewith.

The newly issuing rod is collected on a polished stainless steel plate positioned 7.62 cm. below the orifice until the rate visually slows or until four minutes elapses, whichever occurs first, at which point the rod is cut and the watch stopped. The extrudate is weighed and an "extrudability index" is calculated and reported as grams per 10 minutes.

During collection, any exudation or evolution of off-gas is noted. The extrudate is examined for exudation or melt fracture on its surface, clarity, color, toughness, and bubbles. Exudation or volatilization can also be evidenced by the appearance of a fog of plasticizer on the steel plate.

Compositions which exhibit an extrudability index equal to or greater than 0.5 per 10 minutes and which are smooth, tough (as evidenced by bending the rod upon itself without breakage), non-bubbled and non-exuded are considered satisfactory.

B. Compatibility of the components of the melt extruded composition is determined by storing the extrudate for 48 hours at 70% relative humidity. Development of sweaty or wet surfaces on the extrudate as a result of such treatment are indicative of unsatisfactory compatibility.

IV Packaging and Handling

A. Nitrogen Flex Test

To determine the ability of a bone dry film to be handled immediately after issuing from a melt extruder without breakage, aqueous cast film strips approximately 2.54 cm. × 10.2 cm., are hung overnight at 25° C. in a dry box (which dry box had previously been purged with nitrogen so as to achieve a 0 to 10% relative humidity). The strips are thereafter creased in the short direction twice along the same fold. If no shattering or cracks result, the film is considered satisfactory.

B. Heat Sealability

The ability of a film (equilibrated ≧2 hours at 27–70% relative humidity) to be formed into packages on an automatic packaging machine is judged using a Sentinel Pacemaker Impulse Heat Sealer (Model 12 TP, Packaging Industries, Hyannis, Massachusetts). The movable upper jaw is equipped with a 0.32 cm. nichrome ribbon. Both the upper and the bottom jaws are covered with Teflon ® impregnated glass fabric.

A double 2.54 cm. × 10.2 cm. strip of film of 1–2 mil thickness is heat sealed at 2.11 kilograms/cm.$^2$ with an impulse time of 3.5 seconds or less. The film is satisfactorily heat-sealable if (1) it does not burn through during the sealing step and (2) the heat-sealed area of the film is at least as strong as the unsealed areas. The latter can be determined by attempting to pull the seal apart. If the seal parts no sooner than an unsealed portion of the film tears, the heat-seal is satisfactory.

C. Wet Package Drop Strength Test

This test simulates the behavior of an 8 ounce package during storage and rough handling in shipment.

Lead shot (3.36 mm. diameter, 45 grams) is heat sealed in a packet (5.08 cm. × 5.08 cm. layflat) formed from water-soluble film (1.5–2.0 mils). The packet is equilibrated at 55–70% RH (≧5 hours) and then heat sealed in a moistureproof overwrap of 3.5 mil laminate composed of polyethylene/aluminum foil/polyethylene/Kraft paper. The overwrapped package is equilibrated at the desired temperature (≧15 hours) and then quickly dropped 1.22 meters onto a tile floor. Water-soluble packages which remain intact at −6° C. or lower pass the test; otherwise they fail. Packages which pass the test at −6° C. but fail at −15° C. are rated "Good"; those that pass at −15° C. are rated "Excellent".

D. Dry Package Drop Strength Test

This test is performed in the same manner as that described for the Wet Package Drop Strength Test except that the relative humidity used for conditioning the package is 10 to 15%. Water soluble packages which remain intact at 25° C. or lower pass the test; otherwise, they fail. Packages which pass the test at 25° C. but which fail at 10° C. are rated "Good". Packages which pass the test at 10° C. or lower are rated "Excellent".

V. Auxiliary Packaging Tests

A. Tensile Properties

Tensile properties and percent elongation are measured on 2.54 cm.×5.08 cm. strips of film using an Instron tester with a cross head speed of 5.08 cm./minute.

B. Stress Flex

Resistance to flexing under stress is determined by conditioning for 24 hours at a given relative humidity a 10.2 cm.×17.8 cm. film to be tested. Strips which are 2.54 cm. wide are clamped along each of the 17.8 cm. edges between two parallel rubber-faced jaws, 1.27 cm. apart, and in the same plane. The 5.08 cm. width of unclamped film forms a "U" shape between the jaws. The assembly is arranged to rotate the common plane of the jaws at 60 rpm around a center line lying in the plane in the 10.2 cm. direction of the film, and passing through the center of the closed jaws. One jaw is fixed. The second jaw, weighing 681 grams, is arranged to slide freely, maintaining parallelism with the 1.27 cm. spacing from the fixed jaw and restrained only by the film under test. Thus, in each half revolution of the assembly, the movable jaw moves relative to the fixed jaw, removing the slack from the film specimen being tested, and producing a series of diagonal and parallel wrinkles in the film extending from jaw to jaw. When the plane of the jaws is vertical, a load of 681 grams is applied to the film under test. The sliding jaw applies an initial shock load to the film each half revolution as it slides from one extreme position to the other. Each half revolution is counted as one stress-flex cycle. The test is terminated when the film sample breaks, allowing the movable jaw to strike a switch which interrupts the electrical power used to rotate the assembly. Films giving flex cycles of $\geq 200$ without breakage are satisfactory.

C. Slip

Ease of slip of the extruded films over rigid surfaces, e.g. a forming collar or tube of a vertical make-and-fill packaging machine, is determined by measuring the Kinetic Coefficient of Friction (C.O.F.) of the film. The film is conditioned for at least 2 hours at a relative humidity of 50% at 25° C. A 2-inch wide strip of film is taped flat on a platform driven at 6 inches per minute so that the machine direction of the film is aligned with the drive direction of the platform. A steel disc-shaped puck, 2.75 inches in diameter, having a machined stainless steel flat surface and weighing 2252 grams is placed on the film and attached to a force gauge. The dynamic average force is noted. The C.O.F. is the force value divided by the puck weight; C.O.F. value $\geq 0.3$ are satisfactory. (An instrument that may be used for this purpose is the Coefficient of Friction Tester D-1055 made by Kayeness, Inc. of Downingtown, Pennsylvania).

Slip for a film equilibrated at 50% relative humidity at 25° C. for 2 hours or more can be estimated manually by rubbing the opposing surfaces of a folded piece of film between the thumb and forefinger. If the film surfaces slide over one another, the film slip is satisfactory.

Films prepared from the compositions of this invention by aqueous-casting pass all of Tests, I, II A, II B, III A, III B, IV A and IV B; they also pass Tests IV C and/or IV D. Moreover, aqueous-cast films prepared from the preferred compositions of this invention pass Test V C as well. While some films prepared from compositions of this invention by melt-extrusion do not pass Test II B, all films melt-extruded from all compositions of this invention are equal to or surpass all such aqueous cast films in connection with all of the other tests. Moreover, such melt-extruded films which pass Test II A (but not II B) are sufficiently water-soluble under field conditions wherein good agitation or water warmer than 4° C. is commonly used, e.g. the warm citrus regions wherein water temperatures in the range between 15° and 25° C. are common. In such situations, melt-extruded films would be preferable because of the improved strength characteristics of such films as compared to aqueous-cast films, especially in situations wherein a desiccating material such as a pesticide is being packaged in the film.

Certain steps may be taken to maximize the solubility of melt-extruded films prepared from compositions of this invention. In the process area, as much as possible, shear should be minimized in pelletizing, because too much shear may induce crystallization and/or phase separation. Likewise in film extrusion, compositions of this invention should be brought to a complete melt so as to destroy any crystallites formed in pelletizing, extruded with little shear, and the amorphous tube or sheet formed in film extrusion should be rapidly quenched immediately after draw-down to the final film thickness. From the compositional standpoint, surfactants or dispersants may be used as crystallization inhibitors and/or solubilizers.

In contrast to prior art films, the films prepared from the compositions of this invention have greater toughness (tensile properties, stress flex, and tear strength), less gel on the extruded film surface, and they are more easily used for automatic packaging because of better tracking and better heat seals. The improved wet package drop strength of packages made from the films of this invention means that the packages can be shipped and handled at lower temperatures without breakage, thus providing greater safety and economy to the user. The improved dry package drop strength of packages made from the most preferred films of this invention means that moisture conditioning of the film and/or the cold water-soluble package is less critical during film manufacture and during automatic packaging operations. Costly moisture-proof overwraps for these cold-water-soluble film packages of this invention can be replaced by cheaper ones (e.g., polyethylene). In addition, pesticides which tend to desiccate and embrittle current films can be used with little impairment of the low temperature package drop strength of the most preferred films of this invention.

EXAMPLE 1

A. Powder Feed Preparation for Melt Extrusion

The following powders were fed to a ribbon blender having a capacity of 3 cubic feet:

25 pounds of Elvanol® 51-05 G low molecular weight polyvinyl alcohol (viscosity between 4 and 6 cps, and a degree of hydrolysis between 87.7 and 89.7 mol percent);

17.5 pounds of Elvanol® 52-22 G medium molecular weight polyvinyl alcohol (viscosity between 21 and 25 cps, and a degree of hydrolysis between 87.2 and 89.2 mol percent);

7.5 pounds of a vinyl alcohol/methyl methacrylate copolymer (viscosity between 20 and 35 cps and a degree of hydrolysis between 99.5 and 100 mol percent).

A solution of 10 pounds of Union Carbide Carbowax 400 ® polyethylene glycol (average molecular weight in the range between 380 and 420) and 2.5 pounds of water was sprayed onto the above mixture of powders while tumbling. The water promotes ready absorption of the PEG into the polymers and increases flowability of the resulting powder blend.

B. Pelletizing: Twin Screw Extrusion of Powder Feed

The above powder feed was gravity fed through the hopper of a twin screw melt-extruder (Sentinel E-50, Model 20 T, Packaging Industries; Hyannis, Mass.) with a L/D of 16/1, a vent in the center and a die having two ⅛ inch diameter holes (pelletizing screws:E-50-2).

The extrusion conditions were as follows: 181°–210° C. barrel-die temperatures at 14 rpm; a partial vacuum (19 inches) was applied to the vent port; a melt temperature of 228° C. and a pressure of 600 psi resulted.

Translucent, light yellow rods were made at a rate of 14 lbs/hr and quenched with air knives, conveyed by a conveyer belt, and chopped in-line to pellets having a moisture content of <0.5%.

C. Twin Screw Blown Film Extrusion

The pellets were fed to the same type of extruder as above (with the vent port closed) but equipped with a 4 inch diameter annular die and screen packs of the following mesh: 20/40/60/80/20. The extrusion conditions were: 9 rpm for the screws; barrel-die temperatures of 199°–223° C.; a melt temperature of 212° C. and a pressure of 3100 psi resulted.

The resulting vertically-issuing molten tube was cooled by an air ring, inflated by air, collapsed, nipped, and conveyed to a windup roll. Collapsed tubing was produced which after slitting gave a film with a layflat width of 13.5–15 inches and thickness between 1 and 3 mils (the variations in film width and thicknesses resulting from subjecting the tubing to different degrees of blowing). The resulting film was clear to translucent and had less wrinkles and gel than a similarily blown film comprised of 100 pbw Elvanol ® 51–05 and 15 pbw of PEG 400 as a control. A specimen of the film, having a thickness of 1 mil when tested according to Test II B (Film Disc Cold Water Solubility Rate), gave a drop time of 0.12 minute and a final solubility rate of 1.4 minutes/mil.

EXAMPLE 2

A portion of the collapsed tubing prepared in accordance with Example 1 was slit to yield film having a width of 14.75 inches, which was wound up on cardboard cores to form rolls of film. A roll of that film was used to produce empty "pillow packs" in packaging equipment wherein the lengthwise edge of the film were overlapped 0.75 inch and heat-sealed so as to form a lengthwise seam, and transverse heat seals were formed at 1-foot intervals so as to produce 10–15 packages/minute on an automatic (intermittent motion) vertical-form-fill-and-seal packaging machine. The transverse seals were made with a nichrome ribbon impulse sealer, while the lengthwise heat seals were made with a constantly heated bar type sealer. Both sealing elements were covered with glass fabric impregnated Teflon ® polymer. At 50% relative humidity, the tracking over the rollers, slip over the forming collar and forming tube, and heat sealing characteristics were better than for a control film prepared in accordance with my copending application Serial No. 525,446 from a low molecular weight polyvinyl alcohol, Carbowax ® 400 and Zeolex ® as a slip agent.

EXAMPLE 3

Standard Test II A

Pillow packs of film prepared in accordance with Example 2 were prepared containing a pulverulent pesticide and tested in accordance with Standard Test II A (using a pumping rate of 1 gallon/minute) to give a "break time" of 0.35 minute and a "release time" of 0.65 minute (package sunk); in 1.85 minutes, the film was completely dissolved. No gel was found upon thereafter pumping the tank contents through a 50 mesh screen, at the completion of which 14 minutes had elapsed.

EXAMPLE 4

Filled Package Storage and Spraying

A heat sealed pillow pack (7.25-inch layflat width X 5-inch height) was made pursuant to Example 2 and was filled with 8 oz. of Lannate ® 90 WD methomyl insecticide. The pack was conditioned to 50% RH and then heat sealed within an overwrap. The entire package was aged in an oven for 21 days at 45° C. thus simulating about one year of pesticide storage. Chemical analysis indicated no change in the level of active ingredient during storage.

The intact aged package was delivered easily from the overwrap and was found to pass the spray tank test (Standard test II A).

EXAMPLES 5–11

5. Heat-sealed pillow packs (6.375-inch layflat width X 5-inch height) were made in duplicate pursuant to Example 2, each filled with 4 oz. of Benlate ® benomyl, and each overwrapped in a Kraft paper/polyethylene/-foil envelope.

6. Example 5 was repeated substituting 4 oz. of Manzate ®-D maneb for Benlate ® benomyl.

7. Example 5 was repeated substituting 4 oz. of Manzate ®-200 fungicide (a coordination product of zinc ion and manganese ethylene-bis-dithiocarbamate) for Benlate ® benomyl.

8. Heat-sealed pillow packs identical to those of Example 5 were each filled with 4 oz. of Benlate ® benomyl, and each buried in 1.5 pounds of Manzate ®-D maneb contained in a gusseted bag (5.5-inch layflat width X 10-inch height) made from Kraft paper/polyethylene/foil.

9. Example 8 was repeated substituting Manzate ®-200 fungicide for Manzate ®-D maneb.

10. Heat-sealed pillow packs (6.375-inch layflat width X 14-inch height) were made pursuant to Example 2, each filled with 1.25 pounds of Benlate ® benomyl buried in 7.5 pounds of Manzate ®-D contained in a Kraft paper/polyethylene/foil gusseted bag (11-inch layflat width X 20-inch height).

11. Example 10 was repeated substituting Manzate ®-200 fungicide for Manzate ®-D maneb.

Each of the packages of Examples 5–11 was aged in an oven for 21 days at 45° C. Thereafter, one package from each example was opened. Chemical analysis of the pesticide content of each of the opened packages indicated that there had been no deterioration of dispersion properties or of pesticide assay resulting from aging.

Each remaining duplicate package for each of Examples 5-11 was equilibrated at 10° C., and then dropped from a height of four feet with its flat side down. No package breakage resulted from that drop test.

After the drop test, the contents of the Kraft paper/polyethylene/foil packages of Examples 5-9 were subjected to Test II A, giving the following results.

TABLE 1

| Example | Time in Minutes | | |
|---|---|---|---|
| | Break | Release | Complete Dissolution |
| 5 | 1.2 | 1.0 | 10.5 |
| 6 | 0.6 | 1.1 | 8.0 |
| 7 | 1.0 | 1.5 | 10.0 |
| 8 | 2.4 | 3.0 | 11.9 |
| 9 | 2.5 | 3.1 | 11.9 |

EXAMPLE 12

Auxiliary Packaging Tests

A film prepared according to Example 1 was subjected to Standard Tests V A, B, and C, to give the results which follow:

TABLE 2

| Elongation* | 143/173% |
|---|---|
| Tensile Modulus* | 131,600/61,500 psi |
| Yield Point* | 3100/3000 psi |
| Tensile Strength* | 9300/4300 psi |
| No. of Stress Flex Cycles* | 730/860 |
| Slip-Coefficient | 0.23 |

*Machine Direction/Transverse Direction

EXAMPLE 13

The following components (based upon 100 pbw of resin mixture) were fed to a ribbon blender:

50 parts of Gelvatol ® 20-30 (a low molecular weight polyvinyl alcohol having a viscosity of between 4 and 6 cps and a degree of hydrolysis between 85.5 and 88.7 mol percent);

35 parts of Gelvatol ® 20-60 (a medium molecular weight polyvinyl alcohol having a viscosity between 21 and 25 cps and a degree of hydrolysis between 85.5 and 88.7 mol percent);

15 parts of the copolymer of Example 1;

25 parts of Carbowax 400 ® polyethylene glycol;

1 part of Zeolex ® 23-A hydrated sodium silicoaluminate;

0.1 part of calcium stearate; and 5 parts of water (sprayed onto the solid mixture while being blended in the ribbon blender).

The above powder blend was fed to a twin screw melt extruder (Werner and Pfleiderer Corp., Waldwick, N.J.) wit a L/D of 44/1, corotational screws having a mixing screw configuration with several kneading blocks, 5 barrel sections with each of the 2 sections nearest the die being vented to the atmosphere, and a die having ten 3/16-inch diameter holes.

The extrusion conditions are as follows: 185°-230° C. barrel-die temperatures at 280 rpm, a throughput rate of 154 pounds per hour and a resultant pressure of 0-25 psi.

The pellets prepared in accordance with the foregoing were fed to a Wellex Low Boy melt extruder (Wellex, Inc., Bluebell, PA), having a 2.5-inch diameter standard screw with a Maddox mixing head, a L/D of 30/1, equipped with a 40/80/80 mesh screen pack and a 6-inch diameter Victor annular die with the gap set at 30 mils.

The extrusion conditions for preparing blown film were: 165°-205° C. barrel-die temperatures at 60 rpm, a melt temperature of 200°-215° C. and a pressure between 3300 and 5300 psi at a throughput rate of 100 pounds per hour resulted.

The blown film extrusion was run using 6,000 pounds of gravity-fed pellets. The extrudate from the die emerging vertically upward as a thick tube, was solidified by means of an air collar which impinged air on the tube. The tube was centered by adjustable, crossed guide rods; air issued from holes in the rods to provide a cushion over which the tube slid. The tube was inflated by air, gradually collapsed through an angled, slatted frame, and then nipped by rollers so as to give a layflat width of 15-19 inches of collapsed tube.

The resulting collapsed tube was conveyed by rollers to the windup section at a take-off rate of 40-60 inches/minute. The degree to which the tube was inflated prior to nipping and the take-off rate were controlled to give an average wall thickness in the collapsed of 1.5-2.0 mils at 92% yield based on weight of polymer fed to the film extruder. The collapsed tubing was double slit by fixed knives, delaminated, and wound in-line to give two widestock rolls of film of 13.75-inch width.

"Pillow packs" were produced from the film by the technique described in Example 5. However, these pillow packs were filled with 0.5-1.5 pounds of Benlate ® benomyl, and as the packaging operation took place over a period of several days, the relative humidity varied between 30 and 60% during the packaging operation. Under those conditions, tracking over the rollers, slip over the forming collar and forming tube, and heat-sealing characteristics were better than for the control, just as they were in Example 2.

The packages formed in accordance with this example were used in citrus regions in conventional mixing and spraying equipment. The 1.5 pound soluble bags were overwrapped in Kraft paper/polyethylene/foil gusseted bags which survived cross-country cold weather shipment. As a result, they were delivered intact to spray tanks without dust exposure to field workers. At water temperatures of 66°-76° F., the packages dissolved completely at a sufficiently rapid rate that delays in conventional mixing operations were not encountered. The solubility rates were quite acceptable even with the addition of a wide variety of tank adjuvants and other pesticides, including spray oils, metal salts, maneb, Manzate ®-200 fungicide, methomyl and the like. A variety of 300-1000 gallon mix tanks were used with mechanical or by-pass agitation (as low as 10 gallons per minute delivery). Spraying from the tank mixes was begun in 1.2-3.5 minutes without screen or nozzle residue forming or clogging from undissolved film pieces.

Spray Tank Test II A gave a break time of 0.5 minute, a release time of 1.1 minutes and the test was completed in 11.5 minutes. Film Disc Test II B, modified so as to be run with 25° C. water in a 1-liter beaker with a stirring rate such that a 4 cm. deep vortex was formed, was run on discs having a thickness of 1.8 mils. to give a drop time of 0.3 minute and a final solubility rate of 3.9 minutes per mil. Standard Test II B gave a rate of 15 minutes per mil. at 4° C. When tested by the Wet Package Drop Strength Test (IV C), the water-soluble packages remained intact at −15° C.; and when tested by the Dry Package Drop Strength Test (IV D), the water-soluble packages remained intact at 0° C.

EXAMPLES 14 and 15

Two compositions were prepared which were identical to that of Example 13, except that in each of them, 0.05 parts of calcium stearate was used, and in Example 14, one part of Pluronic ® F 108 surfactant was used, and in Example 15, one part of Plurafac ® A 24 surfactant was used. Pluronic ® F 108 is a flake consisting of 80% of polyoxyethylene groups, 20% polyoxypropylene groups and an approximate molecular weight of 16,250. Pluronic ® F 108 is marketed in the United States by BASF Wyandotte Corporation. Plurafac ® A 24 is a straight-chain primary aliphatic oxyalkylated alcohol having an HLB (hydrophyllic/lipophyllic balance) number 6. Plurafac ® A 24 is marketed in the United States by BASF Wyandotte Corporation.

Both compositions were pelletized in a Werner and Pfleiderer pelletizer similar to that of Example 13, but having a 28 mm. screw diameter, an L/D of 28/1 and a die having two 3/16-inch diameter holes. In Example 14, the barrel die temperatures were 49°–239° C., a melt temperature of 257° C. with a delivery rate of 4 pounds per hour at 250 rpm. In Example 15, the barrel-die temperatures were 85°–239° C., a melt temperature of 261° C., a rate of 17 pounds per hour at 250 rpm and 250 psi. Two barrel sections were used in the pelletizer with that closest to the die being vented to the atmosphere.

Blown film was prepared by melt-extrusion, in both examples, using a Killion single screw extruder (Killion Extruders, Inc., Verona, M. J.) having a 1-inch diameter gradual compression screw with an L/D of 20/1 and equipped with a ¾-inch diameter annular die with a lip gap of 15 mils. The barrel-die temperatures were 140°–230° C. (Example 14) and 100°–250° C. (Example 15); the melt temperatures were 235° C. (Example 14) and 228° C. (Example 15) at a screw rpm of 45 (Example 14) and 48 (Example 15) with a pressure of 700 psi (Example 14) and 700–800 psi (Example 15). Collapsed tubing was produced with a layflat width of 3–4 inches and a thickness between 1 and 3 mils.

Standard test II B gave 0.15 minute drop time and a final solubility rate of 2.3 minutes/mil for a disc 2.2 mils in thickness for Example 14, and 0.8 minute drop time and a final solubility rate of 2.7 minutes/mil for a 1.25-mil thick disc for Example 15. The films of both of Examples 14 and 15 passed the wet-package drop strength test (IV C) at −15° C., and both passed the dry strength drop test (IV D) at 0° C.

EXAMPLE 16

Pelletizing and blown film extrusion were repeated in equipment similar to that of Examples 14 and 15 using compositions containing 45 parts of said low molecular weight polyvinyl alcohol, 35 parts of said medium molecular weight polyvinyl alcohol, 20 parts of said copolymer, 25 parts of said polyethylene glycol, 1 part of said hydrated sodium silico-aluminate, and 0.02 part of calcium stearate. The barrel-die temperatures were 100°–250° C.; the melt temperature was 250° C.; the screw rpm was 250; the pressure was 25 psi, and the through-put was 3 pounds/hour. The film disc solubility test run at 25° C. gave a drop time of 0.55 minutes and a final solubility rate of 1.7 minutes/mil. for a disc having a thickness of 2.0 mils.

EXAMPLES 17–19

Blown films were obtained using a single, gradual compression polyethylene type screw (2-inch barrel diameter) model 1027 Hartig Extruder (Ratio 7.69, L/D=20/1; Hartig Machine Co.; Hillside, N.J.) equipped with a 4-inch diameter annular film die. The films were blown from ribbon blended feeds of the following compositions:

TABLE 3

| | Resin Mix | | | Plasticizer |
|---|---|---|---|---|
| | Gelvatol ® | | | Parts by wt. per 100 pbw of Resin |
| Ex. | 20-30 (wt.%) | 20-60 (wt.%) | Copolymer of Example 1 | Mix Carbowax 400 ®(PEG) |
| 17 | 50 | 35 | 15 | 20 |
| 18 | 55 | 35 | 10 | 20 |
| 19 | 50 | 40 | 10 | 20 |

Barrel-die temperatures were 175°–225° C., melt temperatures 233°–243° C., screw speed 55–67 rpm, and pressures 1,150–1,500 psi.

Heat sealed pillow packs of films prepared in accordance with Examples 17–19 were prepared containing 8 oz. of Lannate ® 90 WD methomyl. The packages were equilibrated to 54% RH and then placed in a moisture-proof overwrap comprised of Kraft paper/foil/polyethylene and the envelope heat-sealed. These packages were loaded into each of four compartments of a cardboard box and the entire assembly cooled to −6° C. The filled box was then dropped three times (once each onto the bottom and two of the sides of the box) from a height of 4 feet onto a concrete floor. The overwraps were opened and the cold water-soluble packs were found to be intact. A melt-extruded control film, made from 100 pbw of Gelvatol 20-30, 16 pbw of Carbowax ® 400 polyethylene glycol, 1 pbw Zeolex ® 23 A hydrated sodium silicoaluminate (slip agent), and 0.15 pbw Mg stearate, gave broken packages when subjected to said drop test.

EXAMPLES 20–21

Aqueous cast films of the following compositions (1.5 mils gauge) were prepared:

TABLE 4

| Elvanol ® | | | |
|---|---|---|---|
| 51–05 g (wt.%) | 52-22 (wt.%) | Copolymer of Example 1 (wt.%) | PEG 400 |
| 50 | 35 | 15 | 20 pbw |
| 50 | 50 | — | 20 pbw |

Heat-sealed pillow packs (2.5×3 inch layflat) of these films containing 10 g of Benlate ® benomyl fungicide were buried in Manzate ®D maneb fungicide contained within glass jars. The filled jars were aged in a 45° C. oven for 21 days and then removed. No deterioration of dispersion properties or of active ingredient assay resulted for either the Benlate ® or Manzate fungicides.

Sections of film, 2 mils in thickness, from the aged packages, when tested in the Film Disc Cold Water Solubility Rate Test (Standard Test II B), gave a drop time of 0.3 to 0.35 minutes and a final solubility rate of 0.7 to 1.0 minute/mil.

EXAMPLES 22-23

Standard Tests II A, II B, IV C and IV D were run on non-aged films of Examples 20-21 and packets prepared therefrom, giving the following:

TABLE 5

| Example | II A (minutes) Break | II A (minutes) Release | II A (minutes) Complete Dissolution | II B Drop Time (minutes) | II B Minutes/Mil | Mils | III A grams/10 mins. | IV C | IV D |
|---|---|---|---|---|---|---|---|---|---|
| 22 | 0.35 | 0.6 | 7.0 | 0.35 | 0.64 | 2.2 | 2.0 | −6° C.: pass; −15° C.: fail | 10° C.: pass |
| 23 | 0.4 | 1.8 | 10.0 | 0.26 | 0.3 | 1.75 | 2.5 | −6° C.: pass | 25° C.: pass |

EXAMPLES 24-29

Aqueous-cast films were prepared from the following compositions (pbw based on 100 pbw of resin mixture):

TABLE 6

| Ex. | Elvanol® 51-05 G | Elvanol® 52-22 | Copolymer of Example 1 | PEG 400 | Adjuvant |
|---|---|---|---|---|---|
| 24 | 55 | 35 | 10 | 20 | — |
| 25 | 50 | 40 | 10 | 20 | — |
| 26 | 45 | 35 | 20 | 20 | — |
| 27 | 50 | 35 | 15 | 15 | — |
| 28 | 50 | 50 | — | 20 | 1 polyethylene oxide* |
| 29 | 45 | 40 | 15 | 20 | — |

*Union Carbide Polyox® WRPA-3154 (high molecular weight)

Standard Tests II B, III A, IV C and IV D were run on films of Examples 24-29 and packages prepared therefrom, giving the following:

TABLE 7

| Example | II B Drop Time (min.) | Min./Mil | Mils | III A g./10 mins. | IV C | IV D |
|---|---|---|---|---|---|---|
| 24 | 0.15 | 0.39 | 1.0 | 1.3 | −6° C.: pass; −15° C.: fail | 25° C.: pass |
| 25 | 0.1 | 0.5 | 1.0 | 1.6 | −6° C.: pass | 25° C.: pass |
| 26 | 0.12 | 0.4 | 1.25 | 1.8 | −15° C.: pass | 0° C.: pass |
| 27 | 0.27 | 0.8 | 1.3 | 1.5 | −15° C.: pass | 0° C.: pass |
| 28 | 0.1 | 0.85 | 1.0 | 2.4 | −6° C.: pass | — |
| 29 | 0.2 | 0.4 | 1.0 | 1.8 | −6° C.: pass | 10° C.: pass |

Standard Test II A was run on packages formed from film of Example 27 giving "break time" of 0.6 minutes, "release time" of 1.7 minutes and total dissolution time of 13.5 minutes.

EXAMPLES 30-31

Aqueous-cast films were prepared from the following compositions (pbw based on 100 pbw of resin mixture):

TABLE 8

| Example | Gelvatol® 20-30 | Gelvatol® 20-60 | Copolymer of Example 1 | PEG 400 |
|---|---|---|---|---|
| 30 | 40 | 50 | 10 | 20 |
| 31 | 50 | 35 | 15 | 25 |

Standard Tests II A, II B, III A, IV C and IV D were run on the films of Examples 30-31 and packages prepared therefrom, giving the following:

TABLE 9

| Example | II A (minutes) Break | II A (minutes) Release | II A (minutes) Complete Dissolution | II B Drop Time (minutes) | Minutes/Mil | Mils | III A grams/10 mins. | IV C | IV D |
|---|---|---|---|---|---|---|---|---|---|
| 30 | 0.25 | 0.85 | 6.0 | 0.45 | 1.1 | 1.4 | 2.6 | −15° C.: pass | 0° C.: pass |
| 31 | 0.35 | 0.92 | 8.0 | 0.3 | 0.8 | 1.75 | 3.8 | −15° C.: pass | 0° C.: pass |

What is claimed is:

1. Cold water-soluble films having a thickness in the range between 0.5 and 10 mils and made from a polymeric composition consisting essentially of (i) a resin mixture consisting essentially of 40 to 55 parts by weight of a low molecular weight polyvinyl alcohol containing acyl groups having 1 to 4 carbon atoms, and having a viscosity in the range between 3 and 10 cps and a degree of hydrolysis in the range between 85 and 90 mol percent; 25 to 60 parts by weight of a medium molecular weight polyvinyl alcohol containing acyl groups having 1 to 4 carbon atoms, and having a viscosity in the range between 10 and 35 cps and a degree of hydrolysis in the range between 85 and 90 mol percent; and 0 to 20 parts by weight of a copolymer made up of 90 to 98 weight percent polymerized vinyl alcohol units and 10 to 2 weight percent of polymerized ester units which in monomeric form have the formula:

$$\begin{array}{c} A \\ \diagdown \\ A \end{array} C=C \begin{array}{c} R \\ \diagup \\ COOAlkyl \end{array}$$

wherein
A is H or —CH$_3$;
A' is H or —COO Alkyl;
R is H,

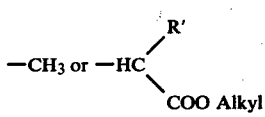

provided that when R is

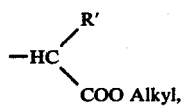

both A and A' are H;
R' is H or —CH₃; and
Alkyl contains 1 to 4 carbon; which copolymer has a viscosity in the range between 10 and 60 cps and a degree of hydrolysis in the range between 95 and 100 mol percent; and (ii) as a plasticizer, 10 to 30 parts by weight of a polyethylene glycol per 100 parts by weight of said resin mixture, said polyethylene glycol having an average molecular weight in the range between 285 and 420; for each of said polymers, the viscosity being determined by the Hoeppler Falling Ball Method ASTM-D 1343-56, Part 8 and the degree of hydrolysis being determined by saponification.

2. The film of claim 1 wherein said polyethylene glycol has an average molecular weight in the range between 380 and 420.

3. The film of claim 1 wherein said resin mixture consists essentially of 40 to 55 parts by weight of said low molecular weight polyvinyl alcohol, 25 to 50 parts by weight of said medium molecular weight polyvinyl alcohol, and 10 to 20 parts by weight of said copolymer.

4. The film of claim 3 wherein said plasticizer is present in an amount in the range between 15 and 25 parts by weight thereof per 100 parts by weight of said resin mixture.

5. The film of claim 4 wherein said polyethylene glycol has an average molecular weight in the range between 380 and 420.

6. The film of claim 1 wherein said resin mixture consists essentially of 40 to 50 parts by weight of said low molecular weight polyvinyl alcohol, 30 to 45 parts by weight of said medium molecular weight polyvinyl alcohol, and 15 to 20 parts by weight of said copolymer.

7. The film of claim 6 wherein said polyethylene glycol has an average molecular weight in the range between 380 and 420.

8. The film of claim 6 wherein said plasticizer is present in an amount in the range between 20 and 25 parts by weight thereof per 100 parts by weight of said vinyl alcohol polymer component.

9. The film of claim 8 wherein said polyethylene glycol has an average molecular weight in the range between 380 and 420.

10. The film of claim 1 containing 5 parts or less by weight of an adjuvant per 100 parts by weight of said vinyl alcohol polymer component; said adjuvant being selected from antioxidants, release agents, antiblock agents, surfactants, dispersants, and slip agents.

* * * * *

UNITED STATES PATENT OFFICE
CERTIFICATE OF CORRECTION

PATENT NO. : 4,156,047
DATED : May 22, 1979
INVENTOR(S) : Robert D. Wysong

It is certified that error appears in the above-identified patent and that said Letters Patent are hereby corrected as shown below:

Column 22, line 60, the formula should appear as follows:

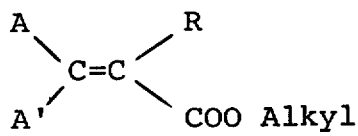

Signed and Sealed this

Thirteenth Day of November 1979

[SEAL]

Attest:

RUTH C. MASON
Attesting Officer

LUTRELLE F. PARKER
Acting Commissioner of Patents and Trademarks